United States Patent [19]

Apperley et al.

[11] Patent Number: 5,832,199
[45] Date of Patent: Nov. 3, 1998

[54] EFFICIENT SYSTEM FOR PREDICTING AND PROCESSING STORAGE SUBSYSTEM FAILURE

[75] Inventors: Norman Apperley, Chandlers Ford, England; James Thomas Brady; Steven Gerdt, both of San Jose, Calif.; Alden B. Johnson, Los Gatos, Calif.

[73] Assignee: International Business Machines Corporation, Armonk, N.Y.

[21] Appl. No.: 880,906

[22] Filed: Jun. 23, 1997

Related U.S. Application Data

[62] Division of Ser. No. 614,427, Mar. 12, 1996, Pat. No. 5,717,850.

[51] Int. Cl.⁶ .................................................. G06F 11/00
[52] U.S. Cl. .................................. 395/182.04; 395/182.05; 395/185.01
[58] Field of Search ..................... 395/182.04, 182.14, 395/183.16, 182.03, 182.05, 183.18; 371/40.1, 51.1; 360/77.03, 77.08, 51, 75

[56] References Cited

U.S. PATENT DOCUMENTS

| | | | |
|---|---|---|---|
| 4,724,495 | 2/1988 | Hedberg et al. | 360/22 |
| 4,989,206 | 1/1991 | Dumphy, Jr. et al. | 371/182.05 |
| 5,005,089 | 4/1991 | Thonas et al. | 360/77.08 |
| 5,084,791 | 1/1992 | Thonas et al. | 360/77.04 |
| 5,088,081 | 2/1992 | Farr | 369/54 |
| 5,124,987 | 6/1992 | Milligan et al. | 371/182.05 |
| 5,148,432 | 9/1992 | Gordon et al. | 371/182.05 |
| 5,220,569 | 6/1993 | Hartness | 371/37.7 |
| 5,239,659 | 8/1993 | Rudeseal et al. | 395/800 |
| 5,257,391 | 10/1993 | DuLac et al. | 395/800 |
| 5,261,083 | 11/1993 | Witkowski et al. | 395/185.01 |
| 5,263,145 | 11/1993 | Brady et al. | 395/441 |
| 5,270,880 | 12/1993 | Ottesen et al. | 360/60 |
| 5,301,072 | 4/1994 | Wilson | 360/77.01 |
| 5,313,626 | 5/1994 | Jones et al. | 395/182.03 |
| 5,333,140 | 7/1994 | Moraru et al. | 371/21.2 |
| 5,333,314 | 7/1994 | Masai et al. | 395/618 |
| 5,347,647 | 9/1994 | Alt et al. | 395/183.04 |
| 5,357,607 | 10/1994 | Sathi et al. | 395/515 |
| 5,359,728 | 10/1994 | Rusnack et al. | 395/182.2 |
| 5,371,882 | 12/1994 | Ludlan | 395/182.05 |
| 5,386,549 | 1/1995 | Norrie et al. | 395/182.13 |
| 5,410,439 | 4/1995 | Egbert et al. | 360/75 |
| 5,608,891 | 3/1997 | Mizuno et al. | 395/441 |
| 5,612,845 | 3/1997 | Smith | 360/137 |
| 5,623,595 | 4/1997 | Bailey | 395/182.04 |
| 5,625,506 | 4/1997 | Dovek et al. | 360/51 |

OTHER PUBLICATIONS

Ng, Spencer W., et al., "Maintaining Good Performance In Disk Arrays During Faiure Via Uniform Parity Group Distribution", *IEEE Publications Ondisc*, pp. 260–269 (Mar. 1993).

*Primary Examiner*—Ly Hua
*Attorney, Agent, or Firm*—Gray Cary Ware Freidenrich

[57] ABSTRACT

Predictive failure analysis of a storage subsystem is efficiently conducted and data quickly recovered from a failed Read operation. This may be implemented in a storage system including a host coupled to a supervising processor that couples to a parity-equipped RAID storage subsystem having multiple HDAs each including an HDA controller and at least one storage medium. In one embodiment, when an HDA experiences an error during a Read attempt, the HDA transmits a recovery alert signal to the supervising processor; then, the processor and HDA begin remote and local recovery processes in parallel. The first process to complete provides the data to the host, and the second process is aborted. In another embodiment, an HDA's PFA operations are restricted to idle times of the HDA. A different embodiment limits HDA performance of PFA to times when the processor is conducting data reconstruction. Another embodiment monitors HDA errors at the supervisory processor level, initiating an HDA's PFA operations when errors at that HDA have a certain characteristic, such as a predetermined frequency of occurrence.

22 Claims, 5 Drawing Sheets

EFFICIENT SYSTEM FOR PREDICTING AND PROCESSING STORAGE SUBSYSTEM FAILURE

This application is a division of application Ser. No.08, 614,427, filed Mar. 12, 1996, now U.S. Pat. No. 5,717,850.

BACKGROUND OF THE INVENTION

1. Field of the Invention

The present invention relates to the prediction and processing of failures in digital data storage systems. More particularly, the invention concerns a method and apparatus for efficiently conducting predictive failure analysis of a storage subsystem and for more quickly providing an output of data after a failed Read operation.

2. Description of the Related Art

Generally, a digital data storage subsystem is an assembly of one or more storage devices that store data on storage media such as magnetic or optical data storage disks. In magnetic disk storage systems, a storage device is called a head disk assembly ("HDA"), which includes one or more storage disks and an HDA controller to manage local operations concerning the disks.

A number of known storage subsystems incorporate certain techniques and devices to predict storage device failures, along with other techniques and devices to quickly recover from device failures. As discussed below, however, these systems may not be completely adequate for use in certain applications.

Predictive Failure Analysis

A number of known storage subsystems employ predictive failure analysis ("PFA") to enhance their storage operations. PFA, which generally serves to detect symptoms indicative of an impending storage failure, may be implemented in a number of different ways. In a typical storage subsystem, the HDA electronics conduct PFA operations for associated storage media, among other functions. Typically, when an HDA detects an impending error during PFA operations, the PFA routine notifies the storage subsystem of the impending failure.

Although PFA operations are often useful in recognizing impending storage subsystem failures, they may impede ongoing storage tasks of the HDAs. In particular, a typical PFA routine may require several hundred milliseconds to complete. Depending upon the particular design of the HDA, during PFA operations the HDA may be (1) capable of conducting limited Read or Write operations, at best, or (2) unavailable for processing any Read or Write operations, at worst. Some applications may be unable to bear such impairments to performance of the HDA's data storage and retrieval functions, albeit temporary.

Data Recovery and Reconstruction

When an HDA fails due to an error occurring in a storage device and a user, application program, or other process requests data from the HDA, some attempt must be made to provide the requested data in spite of the storage device failure. This process, called "data recovery", involves determining the contents of the requested unavailable data and providing the data as an output of the HDA. In many cases, recovery includes two components: data "retry" and data "reconstruction."

Data retry involves the HDA controller of the failed storage device executing a prescribed data retry routine having a finite number of "retry" steps. For example, the HDA may perform multiple attempts to recover failed data while varying certain parameters to possibly improve the chances of recovering the data. Since each retry requires at least one disk rotation, and the entire recovery procedure can require multiple rotations, the retry process may consume a significant amount of time before finally recovering the data.

In contrast to data retry, data "reconstruction" involves the process of reproducing data of the failed storage device using data from other sources and stored parity computations. For a more detailed explanation of various reconstruction schemes, reference is made to *The RAIDbook: A Source Book for Disk Array Technology*, Fourth Edition (Aug. 8, 1994), published by The RAID Advisory Board, St. Peter Minn. As is known, RAID versions subsequent to RAID-0 employ parity to enhance data reliability.

Some known storage systems employ a two-step data recovery procedure. After the HDA unsuccessfully exhausts its retry attempts (first step), the HDA requests assistance from a supervising processor that oversees operations of the multiple HDAs in the storage system. The supervising processor then employs data reconstruction techniques, such as parity reconstruction, to recreate the otherwise lost data (second step). Even in RAID systems, however, two-step data recovery may be unsatisfactory for some applications because it is too time consuming. Not only might an unsuccessful HDA retry routine require considerable time to complete on the HDA level, but the data reconstruction process performed at the supervising processor level may add a significant delay of its own.

SUMMARY OF THE INVENTION

Broadly, the present invention concerns a system that efficiently conducts predictive failure analysis of a storage subsystem and quickly recovers data from a failed read operation. The hardware environment of the system may comprise a storage subsystem including a host coupled to a supervising processor that couples to a parity-equipped RAID storage system having multiple HDAs, each HDA including an HDA controller and at least one storage medium.

In one embodiment, when an HDA experiences an error during a read attempt, the HDA transmits a "recovery alert" signal to the supervising processor. After transmission of this signal, the processor and HDA begin remote and local recovery processes in parallel. In particular, the processor performs data reconstruction while the HDA performs data retry. The first process to complete provides the data to the host, and the second process is aborted.

In another embodiment, an HDA's PFA operations are restricted to the HDA's "idle" times, i.e. periods of time beginnings when there has been no storage access for a predetermined period of time. A different embodiment limits HDA performance of PFA to times when the processor is conducting data reconstruction, to completely avoid any HDA "down time" due to PFA exercises.

Another embodiment monitors HDA errors at the supervisory processor level, initiating an HDA's PFA operations when errors having a certain Characteristic are detected at the HDA. This characteristic, for example, may involve the occurrence of a predetermined number of errors within a certain time period, or the occurrence of a number of errors in a specific range of tracks within a certain time period.

The invention affords its users with a number of distinct advantages. First, the invention provides increased access to data stored in HDAs, since HDA performance of local PFA routines is selectively limited. Additionally, one embodiment of the invention provides faster data recovery, since processor-level and HDA-level recovery procedures are initiated in parallel.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

STRUCTURE

Figure 1:
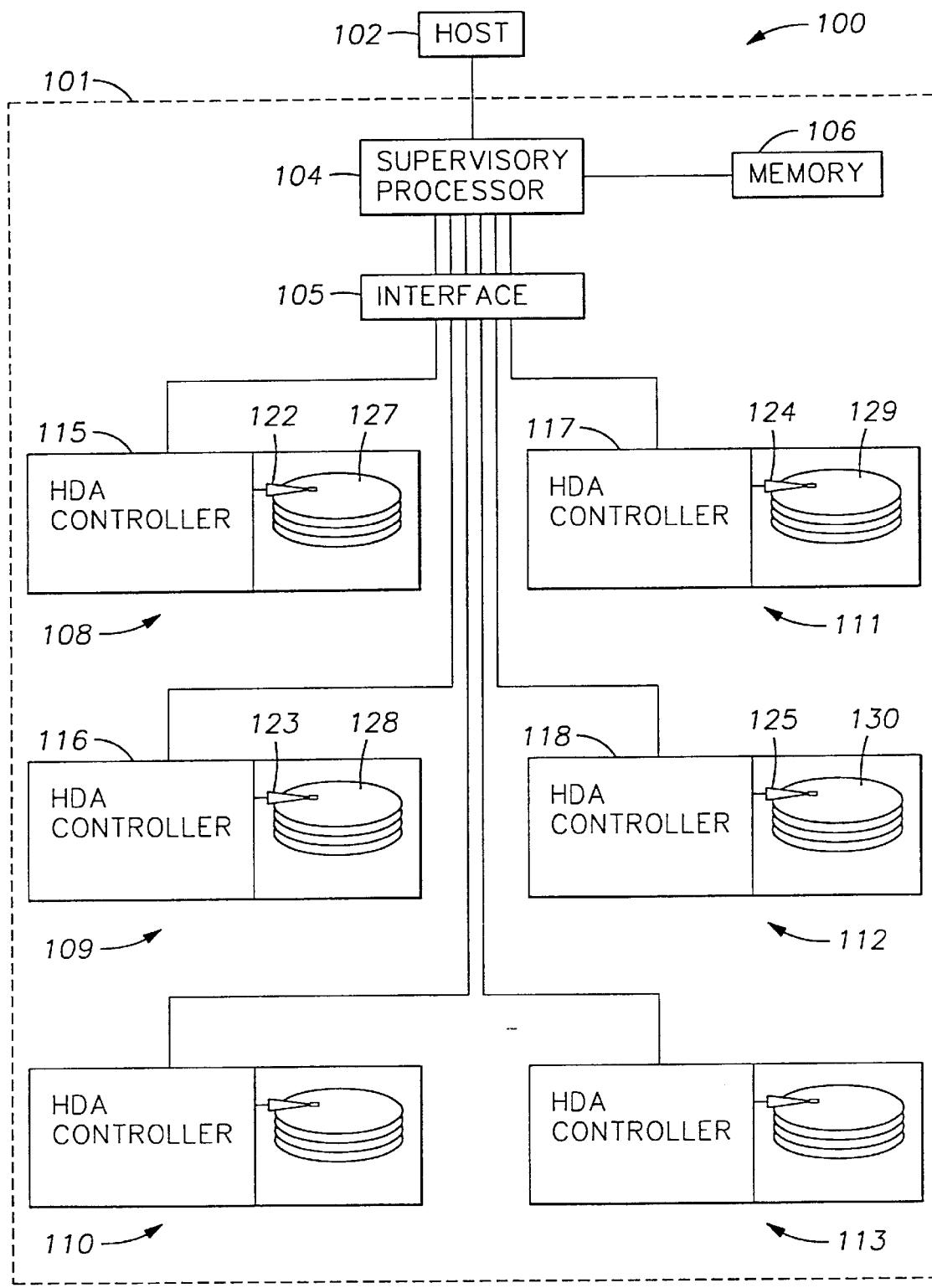
FIG. 1 is a block diagram of exemplary hardware components for implementing the present invention.

As shown by the example of FIG. 1, the hardware components and interconnections of the invention may include a data storage system 100 that includes a host 102 and a storage subsystem 101. The host 102 may comprise, for example, a PC, workstation, mainframe computer, or another suitable host. The storage subsystem 101 may be embodied in an IBM brand RAMAC array subsystem, for example.

The storage subsystem 101 includes a supervisory processor 104 coupled to a plurality of HDAs 108–113. The host 102 and processor 104 exchange commands and data, as discussed in greater detail below. The processor 104 preferably comprises a microprocessor such as the INTEL model i960™. Each of the HDAs 108–113 is accessible via a storage interface 105. In this regard, the interface 105 may comprise an apparatus employing serial storage architecture (known as "SSA"), for example. In the illustrated example, each HDA 108–113 comprises a magnetic storage disk such as a "hard drive." However, in certain applications each HDA 108–113 may comprise a number of different devices, such as optical storage disks, optical or magnetic tape media, RAM, etc.

For use in some or all of the operational embodiments described below, it is preferred that the HDAs 108–113 are operated as a parity-equipped RAID subsystem. For example, the well known RAID-5 protocol may be used, in which case the supervisory processor 104 comprises a RAID controller.

In the illustrated embodiment, the HDAs 108–113 are identical, each including a number of components. The HDA 108, for instance, includes an HDA controller 115, an armature 122 connected to the HDA controller 115, and one or more storage media 127, which comprise magnetic storage disks in the present example. Each HDA controller 115–118 may be embodied in a different ASIC, for example.

Figure 6:
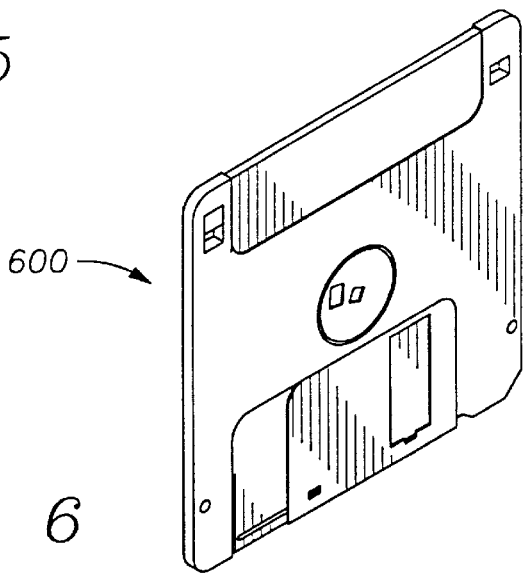
FIG. 6 is an illustrative data storage medium in accordance with the invention.

In the preferred embodiment, the supervisory processor 104 manages operation of the storage subsystem 101 by executing a series of computer-readable programming instructions. These programming instructions may comprise, for example, lines of C++ code. These programming instructions may be contained in a memory 106, which preferably comprises a RAM module, but may instead comprise an EPROM, PLA, ECL, or another suitable storage medium. With respect to the supervisory processor 104, the memory 106 may be stand-alone or incorporated within the supervisory processor 104. Alternatively, the programming instructions may be contained on a data storage medium external to the supervisory processor 104, such as a computer diskette 600 (FIG. 6). Or, the instructions may also be contained on a DASD array, magnetic tape, conventional "hard disk drive", electronic read-only memory, optical storage device, set of paper "punch" cards, or another data storage medium. In still another alternative, the programming instructions may be contained in a reserved space of the storage subsystem 101, such as in a private file system space.

The computer-readable instructions performed by the supervisory processor 104 may be further understood with reference to the detailed description of the invention's operation, set forth below.

OPERATION

In addition to the-hardware aspect described above, this invention contemplates a method aspect involving various processes for operating a storage subsystem. Generally, the storage subsystem is operated to efficiently conduct predictive failure analysis of a storage subsystem and also to quickly recover data from a failed Read operation, as shown in the following description.

Recovery Alert

Figure 2:
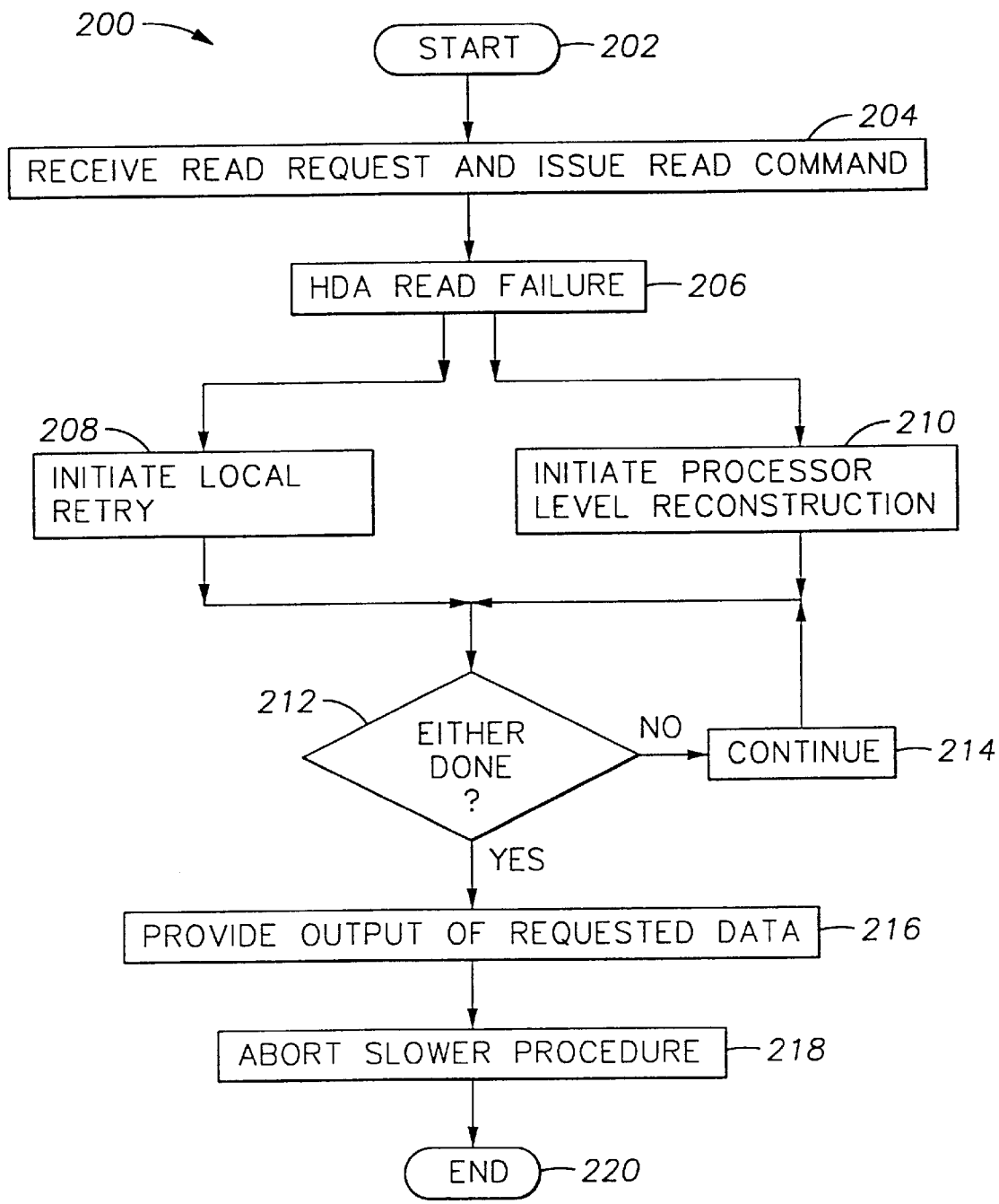
FIG. 2 is a flowchart depicting a sequence for data reconstruction using a recovery alert technique pursuant to the invention.

FIG. 2 depicts a sequence of tasks 200 that illustrate one embodiment of the invention's operation. In this embodiment, when an HDA experiences an error during a read attempt, the HDA transmits a recovery alert signal to the supervising processor. Then, the processor and HDA begin remote and local data recovery processes in parallel. The first process to complete provides the data to the host, and the second process is aborted.

More particularly, after the routine 200 begins in task 202, the processor 104 receives a Read request in task 204. Although this request originates from the host 102 in this example, the request may alternatively originate from another source, such as a user (not shown) when the user submits a request via a user interface device (not shown). After receiving the request, the processor 104 in task 204 issues a Read command to one or more of the HDAs 108–113, as appropriate to the Read command.

Subsequently, one of the HDAs 108–113 in task 206 experiences a Read failure when attempting to carry out the Read command, and promptly issues a "Recover Alert" signal to the processor 104. After this signal is transmitted, two recovery processes are initiated in parallel. Namely:

1. The HDA in task 208 begins a local retry process.
2. Simultaneously, the processor 104 initiates data reconstruction in task 210. In the illustrated embodiment, the processor 104 in task 210 orchestrates reconstruction of the unavailable data using RAID reconstruction techniques. This may involve, for example, applying an exclusive-OR operation to (1) data that corresponds to the failed data and is present in the remaining (non-failed) HDAs, and (2) parity bits that are stored in the HDAs and correspond to the failed data.

In query 212, the processor 104 asks whether either of tasks 208 or 210 have completed. If not, tasks 208 and 210 are permitted to continue in task 214. However, when the first one of the tasks 208/210 completes, the processor 104 in task 216 receives the recovered data produced by that task, and provides the data to the requesting source (e.g. the host 102 or user).

After task 216, the processor 104 aborts the slower one of tasks 208/210 in task 218. Thus, data recovery is performed as quickly as possible, since recovered data is supplied from the faster of tasks 208 and 210. The sequence 200 ends in task 220.

Idle Time PFA Restriction

Figure 3:
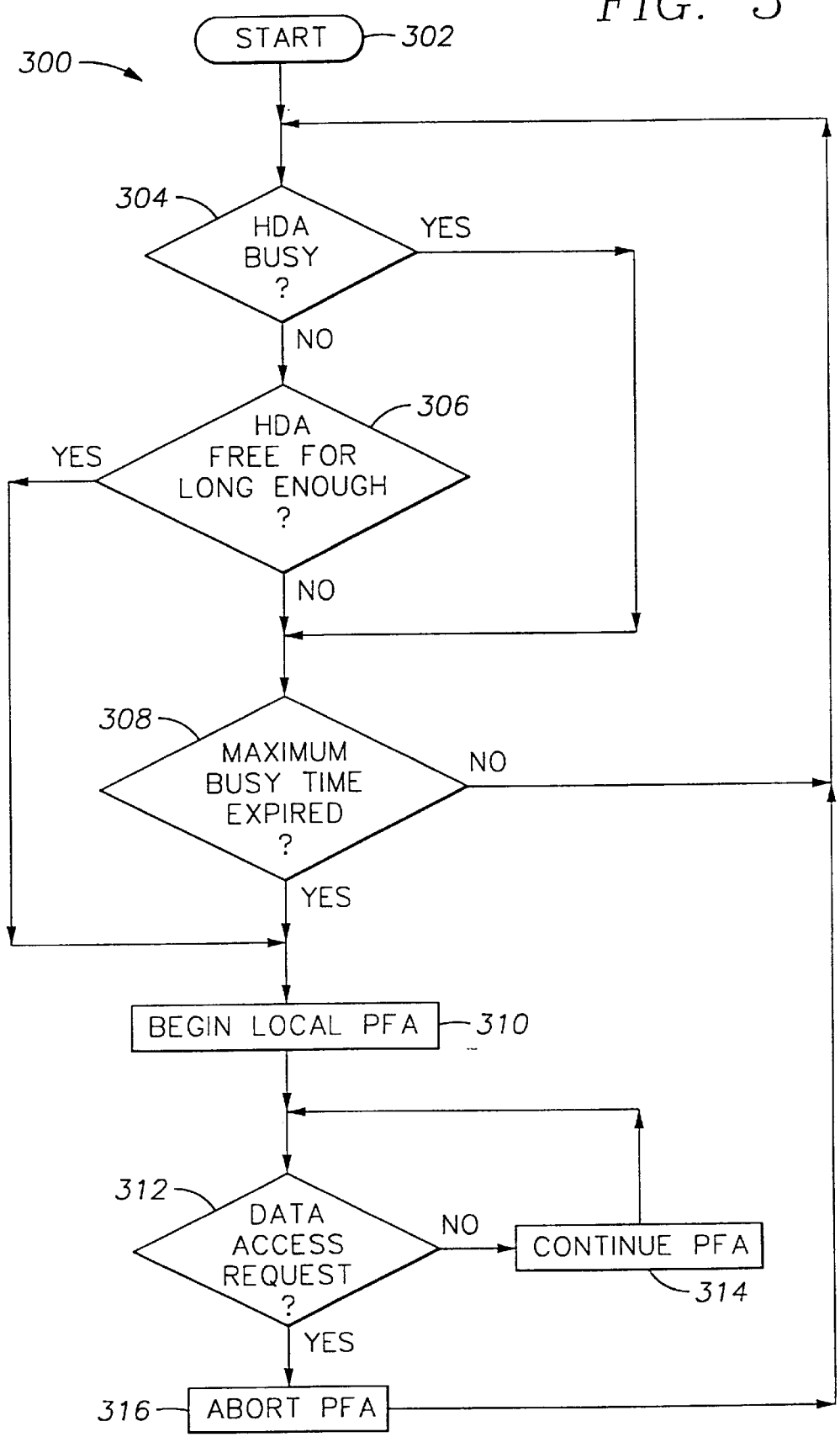
FIG. 3 is a flowchart depicting a sequence for efficient PFA performance by idle time PFA restriction, pursuant to the invention.

FIG. 3 depicts a sequence of tasks 300 that illustrate another embodiment of the invention's operation. Broadly, this embodiment restricts an HDA's PFA operations to idle times of the HDA. The sequence 300 may be performed separately for each one of the HDAs 108–113. To provide an example, the following discussion concerns performance of the sequence 300 for the HDA 108.

After the routine 300 begins in task 302, the HDA controller 115 in query 304 determines whether the HDA 108 is "busy" or "free." The HDA 108 is "busy" when it is processing an access to data of its storage media 127. If the HDA 108 is free, the processor 104 in query 306 asks whether the HDA 108 has been free for more than a predetermined time. This predetermined time, which may be about 100 ms for example, establishes the length of time deemed as "idle" for the HDA 108. If the HDA 108 has been free for the predetermined time period, the processor 104 in task 310 instructs the HDA controller 115 to perform a PFA routine. The PFA routine, for example, may be embodied in microcode contained in memory of the HDA 108.

The HDA controller 115 continues its local PFA in query 312 and task 314 until a data access request is received from the host 102 via the processor 104. At this point, the processor 104 in task 316 instructs the HDA controller 115 to abort its local PFA, and control returns to query 304. As an alternative to steps 312, 314, and 316, the HDA controller 115 may be permitted to complete its local PFA in spite of any data access requests that may occur.

In contrast to the progression described above, control passes to query 308 if query 304 determines that the HDA 108 is busy, or if query 306 determines that the HDA 108 has not been free for the predetermined time. In query 308, the processor 104 determines whether the HDA 108 has been busy for a second predetermined time period. This second predetermined time period establishes the maximum length of time that the HDA can operate without conducting its PFA routine, regardless of the occurrence of any data access requests. Thus, if the HDA 108 has not yet been busy for the second predetermined time period, the processor in query 308 routes control back to query 304. Otherwise, however, the processor 104 advances to query 310 and progresses as described above.

PFA and Data Reconstruction in Parallel

Figure 4:
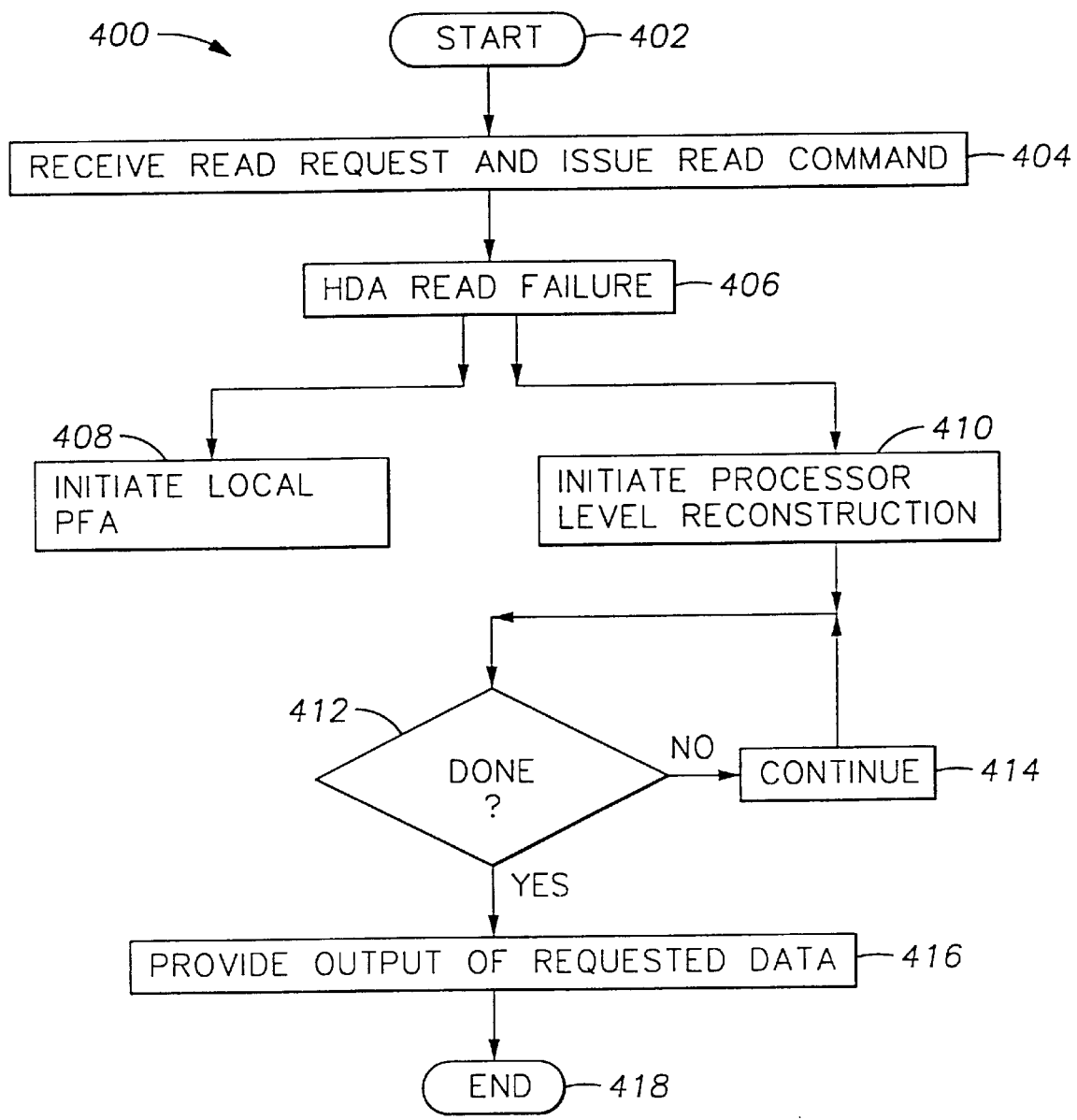
FIG. 4 is a flowchart depicting a sequence for efficient PFA performance by performing PFA only in parallel with data reconstruction, pursuant to the invention.

FIG. 4 depicts a sequence of tasks 400 that illustrate another embodiment of the invention's operation. In this embodiment, HDA performance of local PFA operations is limited to times when the processor is conducting data reconstruction. More particularly, after the routine 400 begins in task 402, the processor 104 receives a Read request in task 404. As in the examples described above, this request originates from the host 102, a user, an application program, or another process. After receiving the request, the processor 104 in task 404 issues a Read command to one or more of the HDAs 108–113.

Subsequently, one of the HDAs 108–113 in task 406 experiences a Read failure when attempting to carry out the Read command. In response to this failure, the processor 104 initiates two sequences in parallel. Namely:

1. On the HDA level, the failed HDA initiates a local PFA routine in task 408.
2. On the supervisory processor level, the processor 104 initiates data reconstruction. In the illustrated embodiment, the processor 104 in task 410 orchestrates reconstruction of the unavailable data using RAID reconstruction techniques. This may involve techniques as described above.

Thus, the local PFA routine does not impede the normal operation of the failed HDA 108. Namely, the PFA routine is performed during a period when the failed HDA 108 would be inactive nonetheless—while the processor performs data reconstruction to reproduce data from the failed HDA 108.

After task 410, query 412 asks whether the processor 104 has finished reconstructing the data. If not, reconstruction continues in task 414. Otherwise, having completed reconstruction, the processor 104 in task 416 provides an output of the requested data to the host 102, user, or other requesting source. The sequence 400 ends in task 418.

High-Level Error Monitoring Triggering PFA

Figure 5:
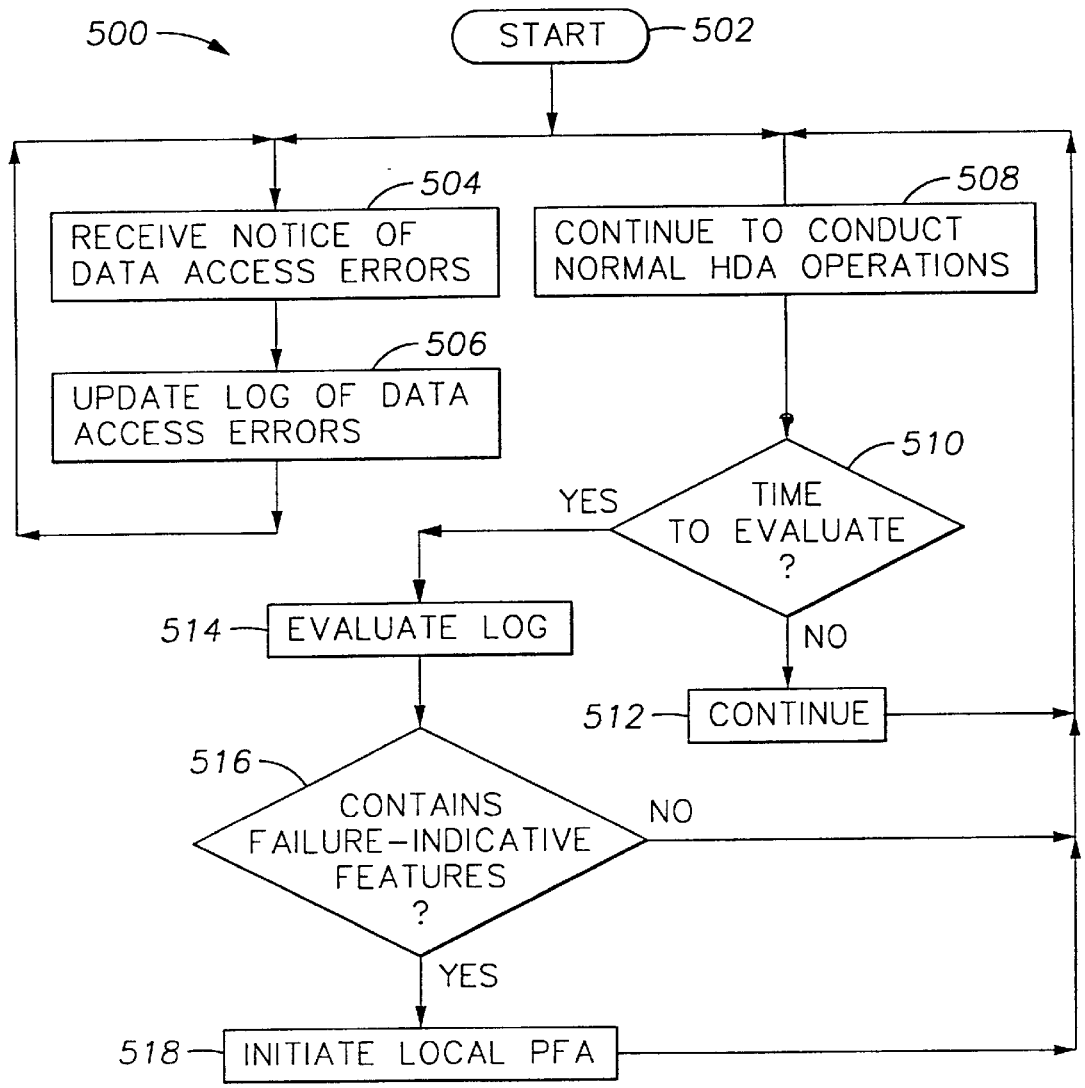
FIG. 5 is a flowchart depicting a sequence for efficient PFA performance by triggering PFA upon high-level error monitoring, pursuant to the invention.

FIG. 5 depicts a sequence of tasks 500 that illustrate another embodiment of the invention's operation. In this embodiment, HDA errors are monitored at the supervisory processor level. The supervisory processor 104 initiates an HDA's PFA operations when errors at that HDA have a certain characteristic, such as a predetermined frequency of occurrence.

More particularly, after the routine 500 begins in task 502, the processor in task 504 receives notice of any data access errors occurring in the HDAs 108–113. Such data access errors, for example, may comprise failures of the storage media 127–130, data check errors, "seek errors" (e.g. failure of a HDA controller 115–118 to properly alien its armature 122–125 to desired data), and the like. In task 506, the processor 104 records each data access error in an error log. Preferably, separate error logs are maintained for each one of the HDAs 108–113, although all errors may be kept in a common log instead. Therefore, tasks 504 and 506 together supplement an error log to reflect all errors that occur in the HDAs 108–113 that are reported to the processor 104.

In parallel with tasks 504 and 506, the system 100 in task 508 continues to conduct normal HDA operations, such as Read and Write operations. Alternatively, tasks 504 and 506 may be conducted on an interrupt or other appropriate basis, rather than being performed in parallel with tasks 504 and 508.

From time to time, the processor 104 determines in query 510 whether it is time to evaluate the error logs for the HDAs 108–113. Such evaluation may be triggered based upon a number of different events, such as expiration of a predetermined time period, addition of a predetermined number of errors to an HDA's error log, etc. If the processor 104 determines that evaluation is not yet warranted, normal operations are continued in tasks 512 and then 508.

When evaluation time arrives, the processor 104 in task 514 evaluates the error log(s). In particular, the processor 104 conducts a remote PFA routine to detect trends and dangerous characteristics indicative of an impending HDA failure. Such characteristics, for example, may be the occurrence of a number of errors within a certain time, or the occurrence of a number of errors within a certain range of tracks of a storage media within a certain time.

If the processor 104 in query 516 finds that this evaluation lacks features indicative of an impending failure, normal HDA operations are continued in tasks 512 and then 508. If, however, signs of an upcoming failure are found, the processor 104 in task 518 instructs the suspect HDA to initiate a local PFA routine. Then, normal HDA operations are continued in tasks 512 and 508.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

What is claimed is:

1. A method for operating a storage system including a supervising processor coupled to a storage subsystem having multiple head disk assemblies ("HDA") each including an HDA controller and at least one storage medium, said method comprising the steps of:

the supervising processor receiving notice of predetermined types of data access errors occurring in the storage subsystem;

the supervising processor recording representations of the errors in an error log; and for each HDA, the supervising processor performing steps comprising:

performing a first predictive failure analysis ("PFA") to determine whether errors associated with the HDA have a selected characteristic; and if the errors associated with the HDA have the selected characteristic, directing the HDA to perform a second PFA to predict future failure of the at least one storage medium of the HDA.

2. The method of claim 1, the at least one storage medium being a single storage medium.

3. The method of claim 1, the at least one storage medium comprising multiple storage media.

4. The method of claim 1, the selected characteristic being that errors associated with the HDA and occurring within a predetermined period of time exceed a predetermined numerical count.

5. The method of claim 1, the selected characteristic being that errors associated with the HDA and occurring within a predetermined range of physical storage locations on the at least one storage medium exceed a predetermined numerical count.

6. The method of claim 5, the physical storage locations comprising tracks of data.

7. The method of claim 1, the selected characteristic being that errors associated with the HDA and occurring within a predetermined period of time and occurring within a predetermined range of physical storage locations on the at least one storage medium exceed a predetermined numerical count.

8. The method of claim 7, the physical storage locations comprising tracks of data.

9. The method of claim 1, the step of directing the HDA to perform the second PFA including the step of identifying potential causes of the predicted future failure.

10. The method of claim 1, the predetermined types of data access errors at the HDAs including seek errors.

11. The method of claim 1, the predetermined types of data access errors at the HDAs including storage media failures.

12. A data storage medium tangibly embodying a machine-readable program of instructions for operating a storage system, the storage system including a supervising processor coupled to a storage subsystem having multiple head disk assemblies ("HDA"), each HDA including an HDA controller and at least one storage medium, said program of instructions for causing the supervising processor to operate the storage system by performing a method comprising the steps of:

the supervising processor receiving notice of predetermined types of data access errors occurring in the storage subsystem;

the supervising processor recording representations of the errors in an error log; and for each HDA, the supervising processor performing steps comprising:

performing a first predictive failure analysis ("PFA") to determine whether errors associated with the HDA have a selected characteristic; and if the errors associated with the HDA have the selected characteristic, directing the HDA to perform a second PFA to predict future failure of the at least one storage medium of the HDA.

13. The method of claim 12, the at least one storage medium being a single storage medium.

14. The method of claim 12, the at least one storage medium comprising multiple storage media.

15. The data storage medium of claim 12, the selected characteristic being that errors associated with the HDA and occurring within a predetermined period of time exceed a predetermined numerical count.

16. The data storage medium of claim 12, the selected characteristic being that errors associated with the HDA and occurring within a predetermined range of physical storage locations on the at least one storage medium exceed a predetermined numerical count.

17. The data storage medium of claim 16, the physical storage locations comprising tracks of data.

18. The data storage medium of claim 12, the selected characteristic being that errors associated with the HDA and occurring within a predetermined period of time and occurring within a predetermined range of physical storage locations on the at least one storage medium exceed a predetermined numerical count.

19. The data storage medium of claim 18, the physical storage locations comprising tracks of data.

20. The data storage medium of claim 12, the step of directing the HDA to perform the second PFA including the step of identifying potential causes of the predicted future failure.

21. The data storage medium of claim 12, the predetermined types of data access errors at the HDAs including seek errors.

22. The data storage medium of claim 12, the predetermined types of data access errors at the HDAs including storage media failures.

* * * * *